(12) United States Patent
Ahn et al.

(10) Patent No.: US 8,630,083 B2
(45) Date of Patent: Jan. 14, 2014

(54) MULTI-LAYERED CAPACITOR AND MANUFACTURING METHOD THEREOF

(75) Inventors: Young Ghyu Ahn, Gyeonggi-do (KR); Byoung Hwa Lee, Gyeonggi-do (KR); Min Cheol Park, Gyeonggi-do (KR); Sang Soo Park, Gyeonggi-do (KR); Dong Seok Park, Seoul (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 0 days.

(21) Appl. No.: 13/447,692

(22) Filed: Apr. 16, 2012

(65) Prior Publication Data

US 2012/0275081 A1   Nov. 1, 2012

(30) Foreign Application Priority Data

Apr. 29, 2011  (KR) .................. 10-2011-0040451

(51) Int. Cl.
*H01G 4/228* (2006.01)
*H01G 4/06* (2006.01)

(52) U.S. Cl.
USPC .............. 361/306.3; 361/311; 29/25.42

(58) Field of Classification Search
USPC ............. 361/303, 305, 311, 306.3; 29/25.42
See application file for complete search history.

(56) References Cited

U.S. PATENT DOCUMENTS

| | | | | |
|---|---|---|---|---|
| 6,433,995 | B2 * | 8/2002 | Nakagawa et al. | 361/311 |
| 7,085,124 | B2 * | 8/2006 | Togashi | 361/303 |
| 7,990,677 | B2 * | 8/2011 | Lee et al. | 361/306.3 |
| 8,149,565 | B2 * | 4/2012 | Lee et al. | 361/301.1 |

FOREIGN PATENT DOCUMENTS

KR   10-2006-0043820 A   5/2006

* cited by examiner

*Primary Examiner* — Eric Thomas
(74) *Attorney, Agent, or Firm* — McDermott Will & Emery LLP (57) ABSTRACT

A multi-layered capacitor includes a capacitor element in which a plurality of dielectric layers are multi-layered, and which comprises a first inner electrode and a second inner electrode that are alternately formed on neighboring dielectric layers of the plurality of dielectric layers, a first external electrode and a second external electrode which are formed on an outside surface of the capacitor element to be electrically connected to the first inner electrode and the second inner electrode, respectively, and a deformation suppressing electrode which is formed on the outside surface of the capacitor element and separated from the first external electrode and the second external electrode to be electrically isolated from the first inner electrode and the second inner electrode.

13 Claims, 8 Drawing Sheets

MULTI-LAYERED CAPACITOR AND MANUFACTURING METHOD THEREOF

CROSS REFERENCE(S) TO RELATED APPLICATIONS

This application claims the benefit under 35 U.S.C. Section 119 of Korean Patent Application Serial No. 10-2011-0040451, entitled "Multi-layered Capacitor and Manufacturing Method thereof" filed on Apr. 29, 2011, which is hereby incorporated by reference in its entirety into this application.

BACKGROUND OF THE INVENTION

1. Technical Field

The present invention relates to a multi-layered capacitor, and more particularly, to a multi-layered capacitor that can noticeably reduce an acoustic noise caused by oscillation by suppressing deformation of the multi-layered capacitor incurred by a reverse piezoelectric effect when the multi-layered capacitor is operated, and a manufacturing method thereof.

2. Description of the Related Art

In general, a multi-layered capacitor, in particular, a multi-layered ceramic capacitor (MLCC) is a chip-type condenser that is mounted on a printed circuit board of a variety of electronic devices, such as a mobile communication terminal, a laptop computer, a desktop computer, and a personal mobile terminal (such as a personal digital assistant (PDA)), and its main function is charging or discharging electricity. The multi-layered capacitor has diverse sizes and a multi-layered pattern according to its use and capacity.

The current technical trend of such a multi-layered ceramic capacitor is towards miniaturization and ultra high capacity, and this can be realized by thin-layered inner electrodes, and thin-layered dielectric layers and a high number of multi-layered dielectric layers.

Hereinafter, a related art multi-layered ceramic capacitor will be explained in detail with reference to FIGS. 1 to 5.

Figure 1:
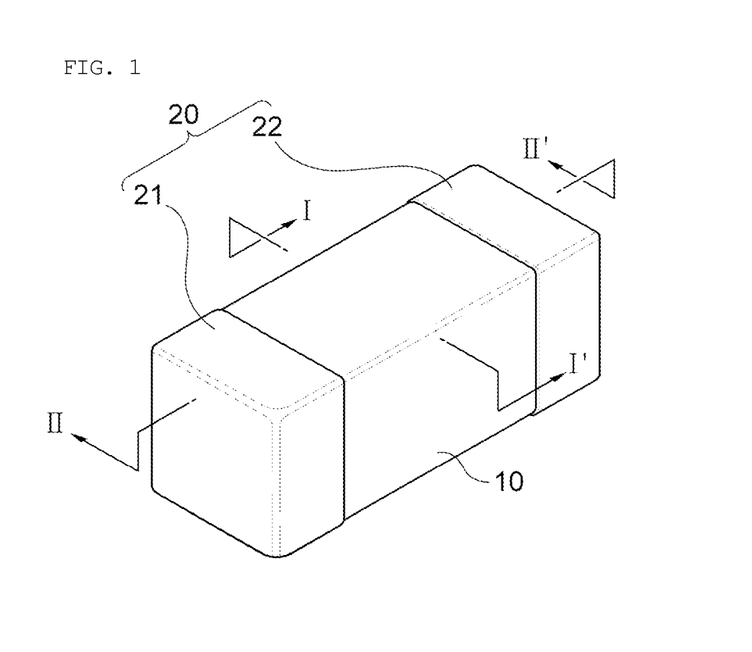
FIG. 1 is a perspective view schematically illustrating a related art multi-layered capacitor.
Figure 2A:
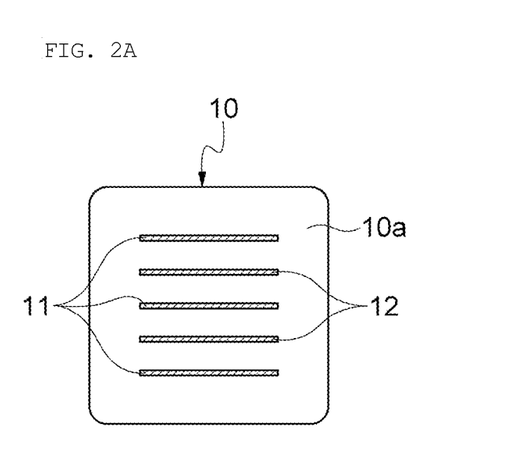
FIG. 2A is a cross sectional view taken along line I-I' of FIG. 1.
Figure 2B:
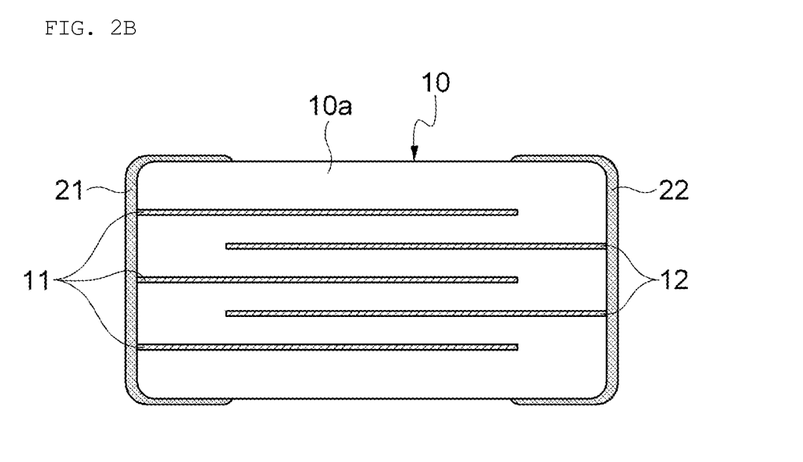
FIG. 2B is a cross sectional view taken along line II-II' of FIG. 1.
Figure 3:
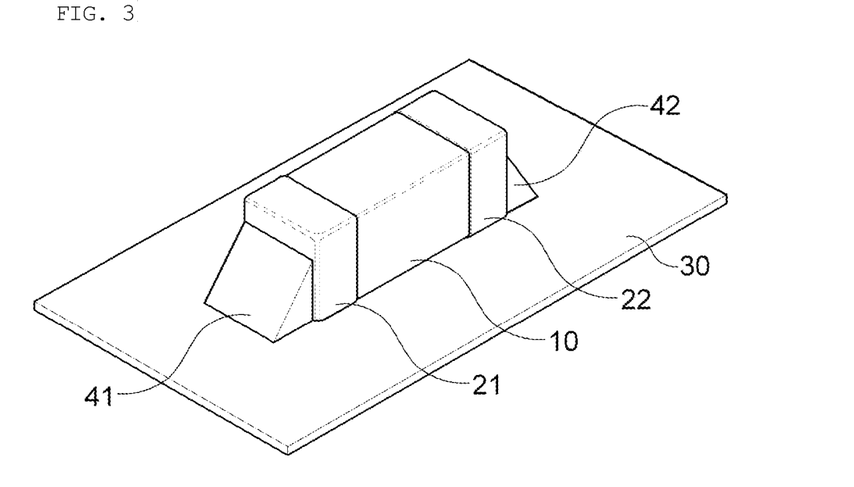
FIG. 3 is a perspective view schematically illustrating the multi-layered capacitor of FIG. 1, which is mounted on a substrate.
Figure 4A:
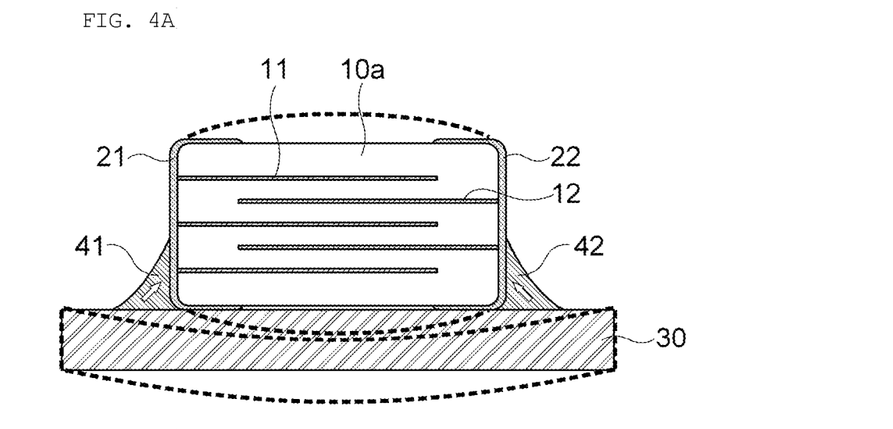
FIGS. 4A and 4B are cross sectional views to schematically explain deformations of the multi-layered capacitor and the substrate, which occur when the multi-layered capacitor of FIG. 3 is operated.
Figure 4B:
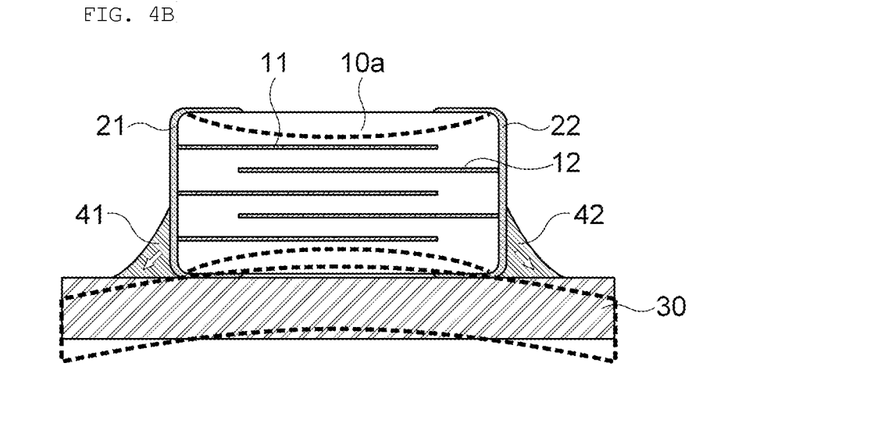
Figure 5:
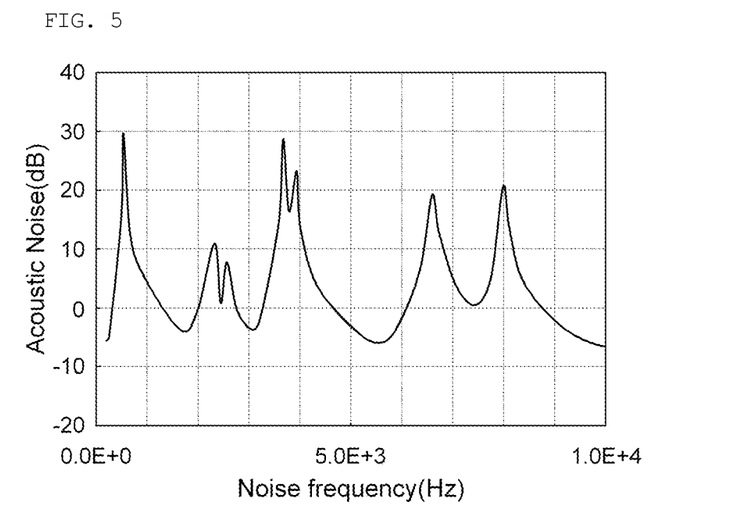
FIG. 5 is a graph schematically illustrating an acoustic noise caused by oscillation of the multi-layered capacitor of FIG. 3.

FIG. 1 is a perspective view schematically illustrating a related art multi-layered capacitor, FIG. 2A is a cross sectional view taken along line I-I' of FIG. 1 and FIG. 2B is a cross sectional view taken along line II-II' of FIG. 1, FIG. 3 is a perspective view schematically illustrating the multi-layered capacitor of FIG. 1 which is mounted on a substrate, FIGS. 4A and 4B are cross sectional views to schematically explain deformations of the multi-layered capacitor and the substrate which occur when the multi-layered capacitor of FIG. 3 is operated, and FIG. 5 is a graph schematically illustrating an acoustic noise caused by the oscillation of the multi-layered capacitor of FIG. 3.

As shown in FIGS. 1 and 2B, the related art multi-layered capacitor generally includes a capacitor element 10 and external electrodes 20 formed at opposite ends of the capacitor element 10.

The capacitor element 10 includes a plurality of dielectric layers 10a multi-layered therein, and also includes a first inner electrode 11 and a second inner electrode 12 which are alternately formed on neighboring dielectric layers.

The external electrodes 20 include a first external electrode 21 formed at one end portion of an outside surface of the capacitor element 10, and a second external electrode 22 formed at the other end portion of the outside surface of the capacitor element 10. The first external electrode 21 is electrically connected to the first inner electrode 11 and the second external electrode 22 is electrically connected to the second inner electrode 12.

As shown in FIG. 3, the multi-layered capacitor as described above is mounted on a substrate 30, that is, a printed circuit board, of a variety of electronic devices such as a mobile communication terminal, a laptop computer, a desktop computer, and a personal mobile terminal (such as a PDA), and main function is charging or discharging electricity.

The multi-layered capacitor is fixedly mounted by electrically connecting the first external electrode 21 and the second external electrode 22 to the substrate 30 by means of solders 41 and 42.

However, as shown in FIGS. 4A and 4B, the related art multi-layered capacitor, which is manufactured using a ferroelectric substance, may incur deformation such as expanding outwards or contracting inwards between the first external electrode 21 and the second external electrode 22 due to a reverse piezoelectric effect or an electrostriction property, when the multi-layered capacitor is operated under an alternating current (AC) voltage.

Therefore, there is a problem in that oscillation occurs due to the deformation of the multi-layered capacitor and an acoustic noise occurs due to the oscillation.

In other words, if an electric field is applied to the first external electrode 11 and the second external electrode 12 formed in the capacitor element 10, electric potentials of a positive polarity (+) and a negative polarity (−) are alternately applied in an alternating current (AC) and thus a mechanical displacement of the multi-layered capacitor occurs, causing oscillation, which is the cause of an acoustic noise.

Also, if the mechanical displacement of the multi-layered capacitor is transmitted to the substrate 30 through the solders 41 and 42, deformation of the substrate 30 occurs and thus oscillation also occurs in the substrate 30. Therefore, the acoustic noise becomes more serious. In particular, referring to FIG. 5, it can be seen that the acoustic noise reaches its peak when oscillation of the multi-layered capacitor is transmitted to the substrate, and as a result, the substrate generates resonance.

SUMMARY OF THE INVENTION

The present invention has been developed in order to solve the above problems, and an object of the present invention is to provide a multi-layered capacitor, which can noticeably reduce an acoustic noise that occurs due to oscillation caused by deformation of the multi-layered capacitor, which is incurred by a reverse piezoelectric effect when the multi-layered capacitor is operated, by suppressing the deformation of the multi-layered capacitor, and a manufacturing method thereof.

Another object of the present invention is to provide a multi-layered capacitor, which can further reduce an acoustic noise that occurs due to oscillation caused by deformation of a substrate on which the multi-layered capacitor is mounted by suppressing the deformation.

According to an exemplary embodiment of the present invention, there is provided a multi-layered capacitor including: a capacitor element in which a plurality of dielectric layers are multi-layered, and which comprises a first inner electrode and a second inner electrode that are alternately formed on neighboring dielectric layers of the plurality of dielectric layers, a first external electrode and a second external electrode which are formed on an outside surface of the capacitor element to be electrically connected to the first inner electrode and the second inner electrode, respectively, and a deformation suppressing electrode which is formed on the outside surface of the capacitor element and separated from the first external electrode and the second external electrode to be electrically isolated from the first inner electrode and the second inner electrode.

The deformation suppressing electrode may be formed on a middle portion of the capacitor element where a length is in a direction in which the plurality of dielectric layers are multi-layered.

The deformation suppressing electrode may be separately formed on opposite side surfaces of the outside surface of the capacitor element.

The deformation suppressing electrode may be formed by coating a conductive paste.

Each of the dielectric layers may further include an adhesion reinforcement electrode which is separated from the first inner electrode or the second inner electrode, exposed to an outside of each of the dielectric layers and connected to the deformation suppressing electrode.

A pair of adhesion reinforcement elements may be formed on a middle portion of each of the dielectric layers opposite each other.

According to another exemplary embodiment of the present invention, there is provided a method for manufacturing a multi-layered capacitor, the method including: forming a capacitor element by multi-layering a plurality of dielectric layers in which a first inner electrode and a second inner electrode are alternately formed on neighboring dielectric layers, forming a first external electrode and a second external electrode on an outside surface of the capacitor element to be electrically connected to the first inner electrode and the second inner electrode, respectively, and forming a deformation suppressing electrode on the outside surface of the capacitor element to be separated from the first external electrode and the second external electrode and thus to be electrically isolated from the first inner electrode and the second inner electrode.

The forming of the deformation suppressing electrode may be performed before or after the forming of the first and the second external electrodes.

In the forming of the deformation suppressing electrode, the deformation suppressing electrode may be formed on a middle portion of the capacitor element where a length is in a direction in which the plurality of dielectric layers are multi-layered.

The deformation suppressing electrode may be separately formed on opposite side surfaces of the outside surface of the capacitor element.

In the forming of the deformation suppressing electrode, the deformation suppressing electrode may be formed by coating a conductive paste.

The forming the capacitor element may further include forming an adhesion reinforcement electrode on each of the dielectric layers, the adhesion reinforcement electrode being separated from the first inner electrode or the second inner electrode, exposed to the outside of each of the dielectric layers, and connected to the deformation suppressing electrode.

A pair of adhesion reinforcement electrodes may be formed on a middle portion of each of the dielectric layers opposite to each other.

DESCRIPTION OF THE PREFERRED EMBODIMENTS

Hereinafter, exemplary embodiments will be described in greater detail with reference to the accompanying drawings. In the following descriptions, same reference numerals and signs are used for the same elements when they are depicted in different drawings and an additional description thereof will be omitted.

First, a multi-layered capacitor according to an exemplary embodiment will be explained in detail below with reference to FIGS. 6 to 9.

Figure 6:
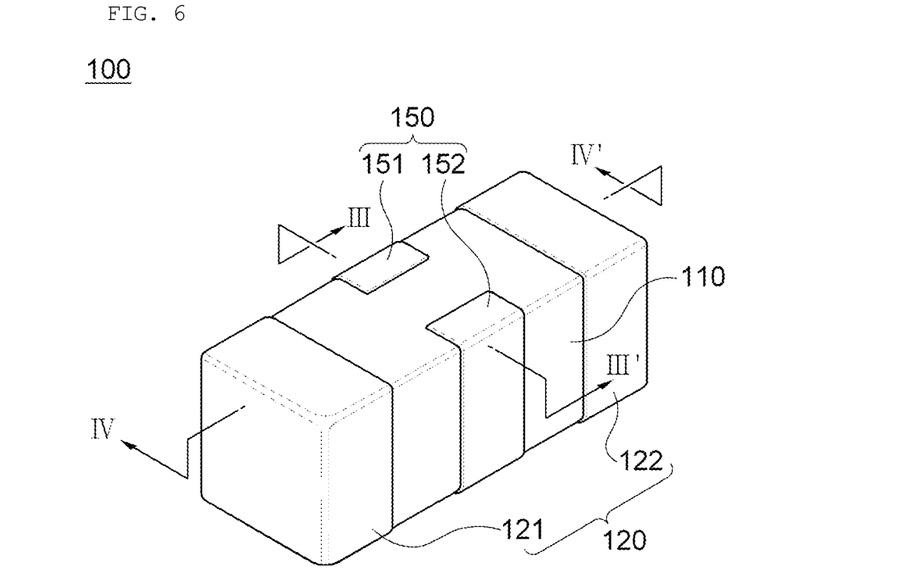
FIG. 6 is a perspective view schematically illustrating a multi-layered capacitor according to an exemplary embodiment.
Figure 7A:
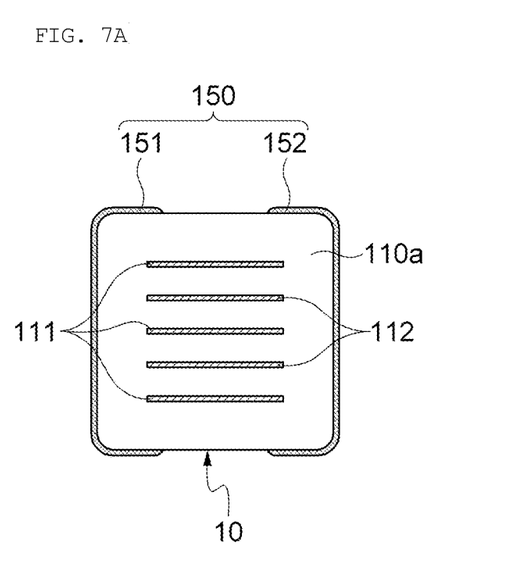
FIG. 7A is a cross sectional view taken along line III-III' of FIG. 6.
Figure 7B:
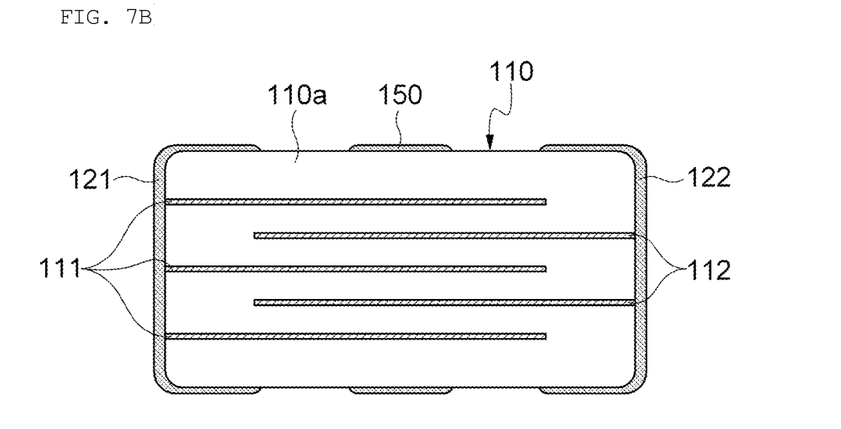
FIG. 7B is a cross section view taken long line IV-IV' of FIG. 6.
Figure 8:
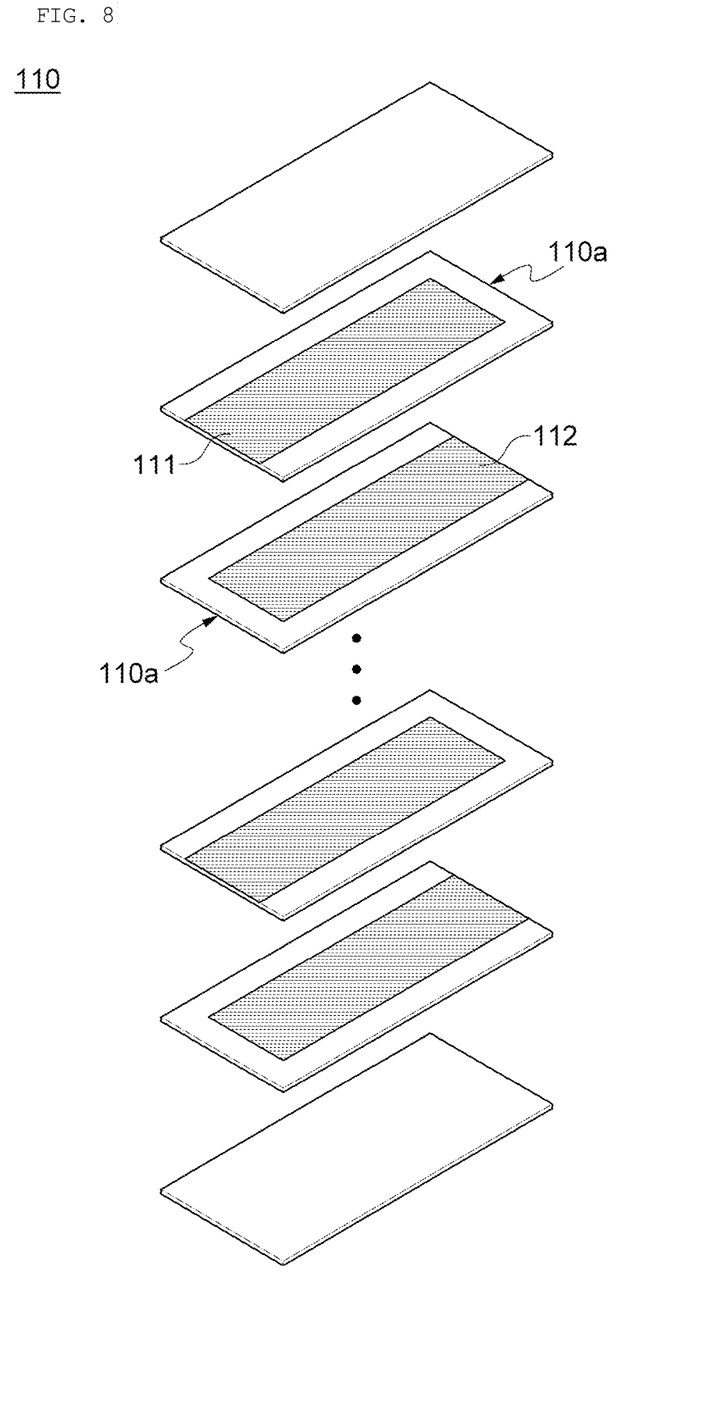
FIG. 8 is an exploded perspective view schematically illustrating a capacitor element applied to a multi-layered capacitor according to a first exemplary embodiment.
Figure 9:
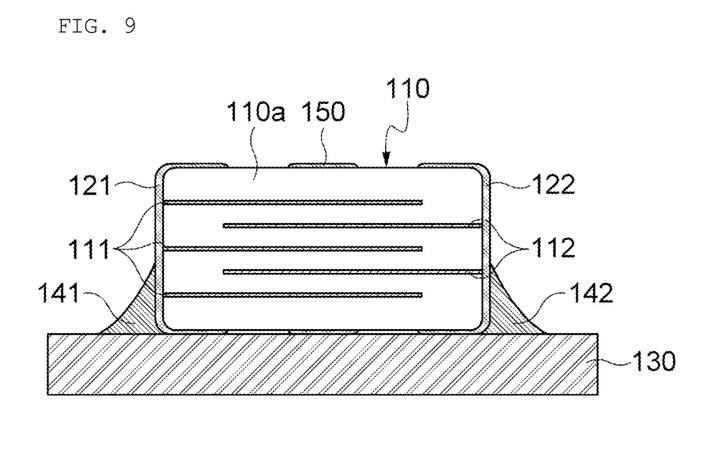
FIG. 9 is a cross sectional view schematically illustrating the multi-layered capacitor of FIG. 6 which is mounted on a substrate.

FIG. 6 is a perspective view schematically illustrating a multi-layered capacitor according to an exemplary embodiment, FIG. 7A is a cross sectional view taken along line III-III' of FIG. 6 and FIG. 7B is a cross sectional view taken along line IV-IV' of FIG. 6, FIG. 8 is an exploded perspective view schematically illustrating a capacitor element applied to the multi-layered capacitor according to a first exemplary embodiment, and FIG. 9 is a cross sectional view schematically illustrating the multi-layered capacitor of FIG. 6, which is mounted on a substrate.

Referring to FIGS. 6 to 7B, a multi-layered capacitor 100 according to an exemplary embodiment generally includes a capacitor element 110 which includes a dielectric layer and at least one first inner electrode 111 and at least one second inner electrode 112 which are provided in the dielectric layer, a first external electrode 121 and a second external electrode 122 which are disposed at opposite ends of an outside surface of the capacitor element 110 and are electrically connected to the first inner electrode 111 and the second inner electrode 112, respectively, and a deformation suppressing electrode 150 which is disposed on the outside surface of the capacitor element 110 to suppress deformation of the multi-layered capacitor when the multi-layered capacitor is operated.

As shown in FIG. 8, the capacitor element 110 forms the one dielectric layer by multi-layering a plurality of dielectric layers 110a. Specifically, the capacitor element 110 is formed by alternately forming the first inner electrode 111 and the second inner electrode 112 on neighboring dielectric layers 110a of the plurality of dielectric layers 110a, multi-layering the plurality of dielectric layers 110a on which the first inner electrode 111 and the second inner electrode 112 are formed alternately, and then pressing the plurality of dielectric layers 110a with high pressure and heat. For reference, the above-described capacitor element 110 is referred to as a first embodiment of the capacitor element so that it can be discriminated from another form of the capacitor element, which will be described later.

The first external electrode 121 and the second external electrode 122 are disposed at the opposite ends of the outside surface of the capacitor element 110. The first external electrode 121 and the second external electrode 122 may be formed by coating the opposite ends of the capacitor element 110 with a conductive paste in a dipping method.

The deformation suppressing electrode 150 may be formed on the outside surface of the capacitor element 110 to be separated from the first external electrode 121 and the second external electrode 122 and thus to be electrically isolated from the first inner electrode 111 and the second inner electrode 112.

The deformation suppressing electrode 150 may be formed on a middle portion of the capacitor element 110 to have a length in a direction in which the plurality of dielectric layers 110a are multi-layered. In other words, the deformation suppressing electrode 150 may be disposed where a length is in a direction in which the first internal electrode 111 and the second internal electrode 112 of the capacitor element 110 are multi-layered.

Also, the deformation suppressing electrode 150 may include a first deformation suppressing electrode 151 and a second deformation suppressing electrode 152, which are formed on opposite side surfaces of the outside surface of the capacitor element 110 and are separated from each other. In other words, the first deformation suppressing electrode 151 and the second deformation suppressing electrode 152 are formed on the opposite side surfaces of the outside surface of the capacitor element 110, which have a surface direction perpendicular to the first inner electrode 111 and the second electrode 112.

The deformation suppressing electrode 150, that is, the first deformation suppressing electrode 151 and the second deformation suppressing electrode 152 may be formed by coating a conductive paste, similar to the first external electrode 121 and the second external electrode 122.

Also, the deformation suppressing electrode 150, that is, the first deformation suppressing electrode 151 and the second deformation suppressing electrode 152 may be connected to the substrate 130, i.e., may be fixed to the substrate 130 by soldering, similar to the first external electrode 121 and the second external electrode 122. At this time, the deformation suppressing electrode 150 may be simply soldered to the substrate 130 so as to be electrically isolated from the substrate 130 and thus not to have an electrical property.

Referring to FIG. 9, the multi-layered capacitor 100 according to the present exemplary embodiment is mounted on the substrate 130, that is, a printed circuit board for a variety of electronic devices such as a mobile communication terminal, a laptop computer, a desktop computer, and a personal mobile terminal (such as a PDA), and its main function is charging or discharging electricity.

The multi-layered capacitor 100 may be fixedly mounted by electrically connecting the first external electrode 121 and the second external electrode 122 to the substrate 130 by means of the solders 141, 142.

Next, a method for manufacturing a multi-layered capacitor according to an exemplary embodiment will be explained in detail.

According to an exemplary embodiment, the method for manufacturing the multi-layered capacitor generally includes forming an element, forming an external electrode, and forming a deformation suppressing electrode.

In the operation of forming the element, the capacitor element 110 is formed by multi-layering the plurality of dielectric layers 110a in which the first inner electrode 111 and the second inner electrode 112 are alternately formed on neighboring dielectric layers.

In the operation of forming the external electrode, the first external electrode 121 and the second external electrode 122 are formed on the outside surface of the capacitor element 110 to be electrically connected to the first inner electrode 111 and the second inner electrode 112, respectively. The first external electrode 121 and the second external electrode 122 may be formed by coating the opposite ends of the outside surface of the capacitor element 110 with a conductive paste using a dipping method.

In the operation of forming the deformation suppressing electrode, the deformation suppressing electrode 150 is formed on the outside surface of the capacitor element 110 to be separated from the first external electrode 121 and the second external electrode 122 and thus to be electrically isolated from the first inner electrode 111 and the second inner electrode 112.

The operation of forming the deformation suppressing electrode may be performed before or after the operation of forming the external electrode. At this time, the deformation suppressing electrode 150 may be formed on the middle portion of the capacitor element 110 disposed with the length in a direction in which the plurality of dielectric layers 110a are multi-layered. Also, the deformation suppressing electrode may be formed on the opposite side surfaces of the outside surface of the capacitor element 110 separately. In other words, the deformation suppressing electrode 150 may include the first deformation suppressing electrode 151 and the second deformation suppressing electrode 152, which are separately formed on the opposite side surfaces of the outside surface of the capacitor element 110, which have a surface direction perpendicular to the first inner electrode 111 and the second inner electrode 112. The deformation suppressing electrode 150 may be formed by coating a conductive paste, similar to the first external electrode 121 and the second external electrode 122.

Figure 10:
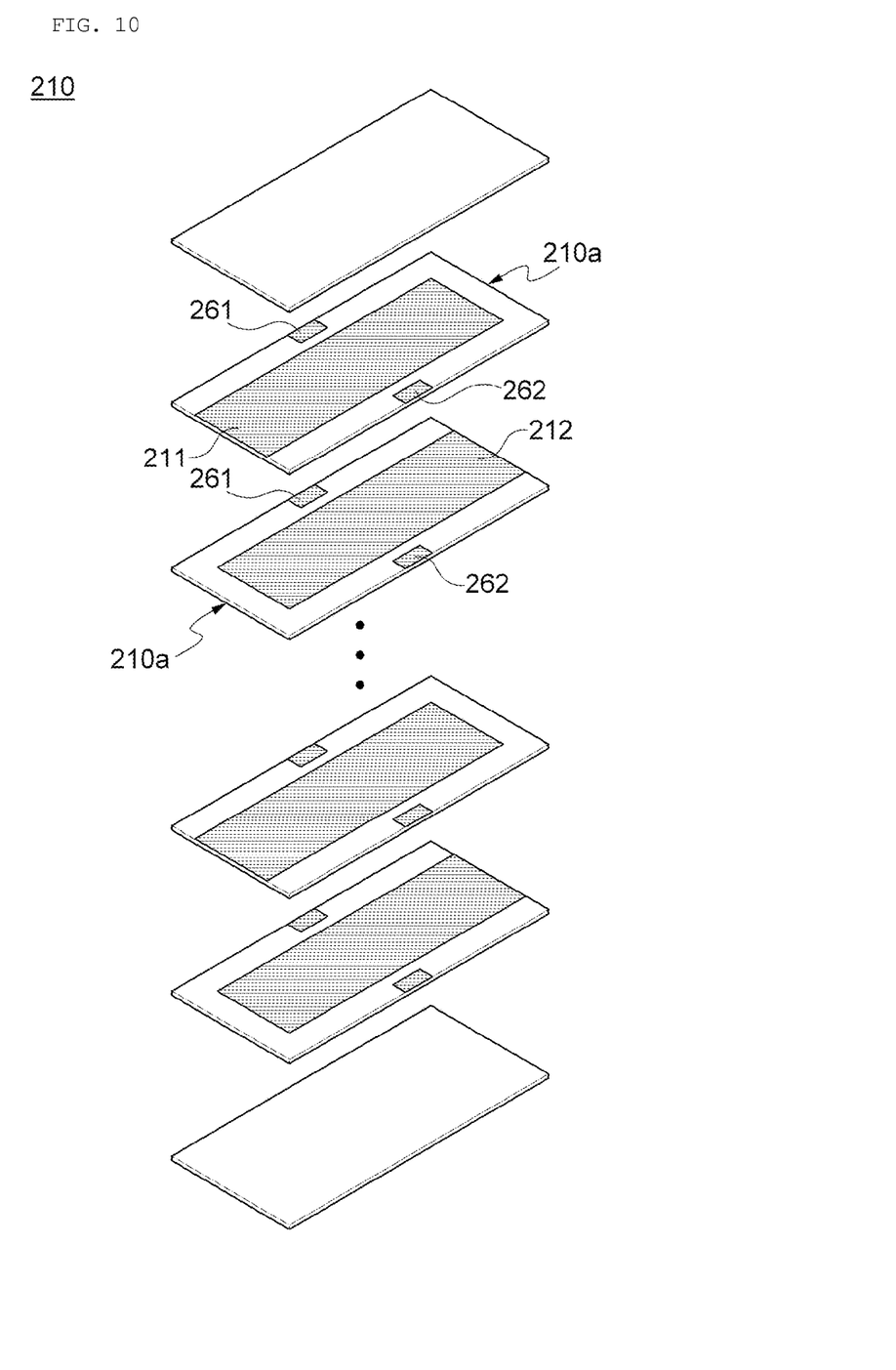
FIG. 10 is an exploded perspective view schematically illustrating a capacitor element applied to a multi-layered capacitor according to a second exemplary embodiment.

FIG. 10 is an exploded perspective view schematically illustrating a capacitor element applied to the multi-layered capacitor according to a second exemplary embodiment. Referring to FIG. 10, a capacitor element 210 in the present exemplary embodiment forms one dielectric layer by multi-layering a plurality of dielectric layers 210a. Each of the dielectric layers 210a may further include adhesion reinforcement electrodes 261 and 262, which are separated from a first inner electrode 211 or a second inner electrode 212 and are exposed to the outside of each dielectric layer 210a.

The adhesion reinforcement electrodes 261 and 262 may be formed on a middle portion of each dielectric layer 210a in pairs opposite to each other and accordingly, the adhesion reinforcement electrodes 261 and 262 are connected to the deformation suppressing electrode, that is, the first and the second deformation suppressing electrodes 151 and 152 formed on the outside surface of the capacitor element 210, after the capacitor element 210 is formed by multi-layering the plurality of dielectric layers 210a, so that it can reinforce adhesion between the outside surface of the capacitor element 210 and the first and the second deformation depressing electrodes 151 and 152.

In the multi-layered capacitor according to the present invention as described above, the deformation suppressing electrode is formed on the outside surface of the capacitor element to be electrically isolated from the inner electrodes and electrically separated from the external electrodes, so that the deformation of the multi-layered capacitor, which occurs due to the reverse piezoelectric effect when the multi-layered capacitor is operated, can be suppressed and the acoustic noise occurring due to the oscillation caused by the deformation of the multi-layered capacitor can be noticeably reduced, in comparison with the related art multi-layered capacitor. In addition, by suppressing the deformation of the multi-layered capacitor and minimizing the oscillation transmitted to the substrate from the multi-layered capacitor, the acoustic noise occurring due to the oscillation caused by the deformation of the substrate can also be reduced.

The effect of the multi-layered capacitor according to the present invention can be observed from the experimental results shown in Table 1 below.

TABLE 1

| Type | Existing MLCC | Deformation Suppressing Electrode Not Connected to Substrate | | Deformation Suppressing Electrode Connected to Substrate | |
|---|---|---|---|---|---|
| | | $1^{st}$ Embodiment | $2^{nd}$ Embodiment | $1^{st}$ Embodiment | $2^{nd}$ Embodiment |
| Acoustic Noise | 40 dB | 37 dB | 36 dB | 33 dB | 32 dB |

Referring to Table 1 above, comparing a result of measuring an acoustic noise after mounting a related art multi-layered capacitor on a substrate and operating it and a result of measuring acoustic noise in the same condition after mounting the multi-layered capacitor of the present invention on the substrate, the multi-layered capacitor of the present invention, that is, the multi-layered capacitor having the deformation suppressing electrode can noticeably reduce the acoustic noise more than the related art multi-layered capacitor.

In particular, in the multi-layered capacitor of the present invention, when the deformation suppressing electrode is connected to the substrate, the acoustic noise is reduced more than when the deformation suppressing electrodes are not connected to the substrate, and, when the multi-layered capacitor includes the capacitor element having the adhesion reinforcement electrode (second embodiment), the acoustic noise is reduced more than when the multi-layered capacitor does not include the capacitor element having the adhesion reinforcement electrode (first embodiment).

As described above, according to the multi-layered capacitor and the manufacturing method thereof, by forming the deformation suppressing electrode on the outside surface of the capacitor element to be electrically isolated from the first and the second inner electrodes and electrically separated from the first and the second external electrodes, the deformation of the multi-layered capacitor occurring due to the reverse piezoelectric effect when the capacitor is operated can be suppressed and thus the acoustic noise occurring due to the oscillation caused by the deformation of the multi-layered capacitor can be noticeably reduced.

Also, according to the multi-layered capacitor and the manufacturing method thereof, by suppressing the deformation of the multi-layered capacitor and minimizing the oscillation transmitted to the substrate from the multi-layered capacitor, the acoustic noise occurring due to the oscillation caused by the deformation of the substrate can be noticeably reduced.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims. Accordingly, such modifications, additions and substitutions should also be understood to fall within the scope of the present invention.

What is claimed is:

1. A multi-layered capacitor comprising:
    a capacitor element in which a plurality of dielectric layers are multi-layered, and which includes a first inner electrode and a second inner electrode that are alternately formed on neighboring dielectric layers of the plurality of dielectric layers;
    a first external electrode and a second external electrode which are formed on an outside surface of the capacitor element to be electrically connected to the first inner electrode and the second inner electrode, respectively; and
    a deformation suppressing electrode which is formed on the outside surface of the capacitor element and separated from the first external electrode and the second external electrode to be electrically isolated from the first inner electrode and the second inner electrode,
    wherein the deformation suppressing electrode is arranged and configured such that the deformation suppressing electrode does not affect electrical characteristics of the multi-layered capacitor.

2. The multi-layered capacitor according to claim 1, wherein the deformation suppressing electrode is formed on a middle portion of the capacitor element disposed with a length in a direction in which the plurality of dielectric layers are multi-layered.

3. The multi-layered capacitor according to claim 2, wherein the deformation suppressing electrode is separately formed on opposite side surfaces of the outside surface of the capacitor element.

4. The multi-layered capacitor according to claim 1, wherein the deformation suppressing electrode is formed by coating a conductive paste.

5. The multi-layered capacitor according to claim 1, wherein each of the dielectric layers further includes an adhesion reinforcement electrode which is separated from the first inner electrode or the second inner electrode, exposed to an outside of each of the dielectric layers and connected to the deformation suppressing electrode,
    wherein the adhesion reinforcement electrode is arranged and configured such that the adhesion reinforcement electrode does not affect electrical characteristics of the multi-layered capacitor.

6. The multi-layered capacitor according to claim 5, wherein a pair of adhesion reinforcement elements is formed on a middle portion of each of the dielectric layers opposite to each other.

7. A method for manufacturing a multi-layered capacitor, the method comprising:
    forming a capacitor element by multi-layering a plurality of dielectric layers in which a first inner electrode and a second inner electrode are alternately formed on neighboring dielectric layers;

forming a first external electrode and a second external electrode on an outside surface of the capacitor element to be electrically connected to the first inner electrode and the second inner electrode, respectively; and forming a deformation suppressing electrode on the outside surface of the capacitor element to be separated from the first external electrode and the second external electrode and thus electrically isolated from the first inner electrode and the second inner electrode, wherein the deformation suppressing electrode is arranged and configured such that the deformation suppressing electrode does not affect electrical characteristics of the multi-layered capacitor.

8. The method according to claim 7, wherein the forming of the deformation suppressing electrode is performed before or after the forming of the first and the second external electrodes.

9. The method according to claim 7, wherein in the forming of the deformation suppressing electrode, the deformation suppressing electrode is formed on a middle portion of the capacitor element disposed with a length in a direction in which the plurality of dielectric layers are multi-layered.

10. The method according to claim 9, wherein the deformation suppressing electrode is separately formed on opposite side surfaces of the outside surface of the capacitor element.

11. The method according to claim 7, wherein, in the forming of the deformation suppressing electrode, the deformation suppressing electrode is formed by coating a conductive paste.

12. The method according to claim 7, wherein the forming of the capacitor element further includes forming an adhesion reinforcement electrode on each of the dielectric layers, the adhesion reinforcement electrode being separated from the first inner electrode or the second inner electrode, exposed to an outside of each of the dielectric layers, and connected to the deformation suppressing electrode, wherein the adhesion reinforcement electrode is arranged and configured such that the adhesion reinforcement electrode does not affect electrical characteristics of the multi-layered capacitor.

13. The method according to claim 12, wherein a pair of adhesion reinforcement electrodes is formed on a middle portion of each of the dielectric layers opposite to each other.

* * * * *